United States Patent [19]
Kalkunte et al.

[11] Patent Number: 5,774,658
[45] Date of Patent: Jun. 30, 1998

[54] ARRANGEMENT FOR ACCESSING MEDIA IN A NETWORK HAVING UNIVERSAL MULTIPLE ACCESS NODES AND CARRIER SENSE NODES

[75] Inventors: Mohan Kalkunte, Sunnyvale; Jayant Kadambi, Milpitas; Jim Mangin, San Ramon, all of Calif.

[73] Assignee: Advanced Micro Devices, Inc., Sunnyvale, Calif.

[21] Appl. No.: 713,880

[22] Filed: Sep. 17, 1996

[51] Int. Cl.$^6$ .................................................. G06F 3/00
[52] U.S. Cl. .................................. 395/200.6; 395/200.58
[58] Field of Search .................... 395/200.57, 200.58, 395/200.53, 200.59, 200.8, 200.6; 370/346, 347, 348, 335, 336, 441, 445, 437

[56] References Cited

U.S. PATENT DOCUMENTS

| | | | |
|---|---|---|---|
| 5,526,355 | 6/1996 | Yang | 370/85.3 |
| 5,619,496 | 4/1997 | Weir | 370/363 |
| 5,655,149 | 8/1997 | Muegge | 395/830 |
| 5,696,765 | 12/1997 | Safadi | 370/436 |

OTHER PUBLICATIONS

AMD, AM79C970 PCnet™–Single–Chip Ethernet Controller for PCI Local Bus, Jun. 1994, pp. 1–868–1–1033.

Breyer et al., "Switched and Fast Ethernet: How It Works and How to Use It", Ziff–Davis Press, Emeryville, Calif. (1995), pp. 60–70.

Johnson, "Fast Ethernet: Dawn of a New Network", Prentice–Hall, Inc. (1996), pp. 158–174.

*Primary Examiner*—Eric Coleman

[57] ABSTRACT

A network includes a combination of carrier-sense stations and Universal Multiple Access (UMA) stations using a time slot multiple access protocol. The network is configured to include assigned time slots for the respective UMA stations and unassigned time slots reserved for the carrier-sense stations to access the shared network media. Each of the UMA stations is provided with a corresponding assigned time slot and the total number of time slots. Since the UMA stations access the media only during the assigned time slot, the carrier-sense stations can contend for access to the media after waiting a minimum interpacket gap (IPG) after sensing deassertion of the receive carrier on the media. The UMA stations may also be modified to attempt access of the media using Ethernet-compliant, carrier-sense multiple-access with collision detection (CSMA/CD) protocol when a current time slot corresponds to a mixed-use time slot.

23 Claims, 5 Drawing Sheets

ARRANGEMENT FOR ACCESSING MEDIA IN A NETWORK HAVING UNIVERSAL MULTIPLE ACCESS NODES AND CARRIER SENSE NODES

TECHNICAL FIELD

The present invention relates to network interfacing and more particularly, to methods of accessing a shared media in a network having a combination of Universal Multiple Access (UMA) nodes using time slot multiple access protocol and carrier-sense nodes.

BACKGROUND ART

Local area networks use a network cable or other media to link stations on the network. Each local area network architecture uses a media access control (MAC) enabling network interface cards at each station to share access to the media.

The Ethernet protocol ISO/IEC 8802-3 (ANSI/IEEE Std. 802.3, 1993 edition) defines a half-duplex media access mechanism that permits all stations to access the network channel with equality. Each station includes an Ethernet interface card that uses carrier-sense multiple-access with collision detection (CSMA/CD) to listen for traffic on the media. Transmission by a station begins after sensing a deassertion of a receive carrier on the media, indicating no network traffic. After starting transmission, a transmitting station will monitor the media to determine if there has been a collision due to another station sending data at the same time. If a collision is detected, both stations stop, wait a random amount of time, and retry transmission.

Any station can attempt to contend for the channel by waiting a predetermined time after the deassertion of the receive carrier on the media, known as the interpacket gap (IPG) interval. If a plurality of stations have data to send on the network, each of the stations will attempt to transmit in response to the sensed deassertion of the receive carrier on the media and after the IPG interval, resulting in a collision.

Ethernet networks mediate collisions by using a truncated binary exponential backoff (TBEB) algorithm, which provides a controlled pseudorandom mechanism to enforce a collision backoff interval before retransmission is attempted. According to the truncated binary exponential backoff algorithm, a station keeps track of the number of transmission attempts (j) during the transmission of a current frame. The station computes a collision backoff interval as a randomized integer multiple of a slot time interval, and attempts retransmission after the collision backoff interval. The station will attempt to transmit under the truncated binary exponential algorithm a maximum of sixteen times.

Another arrangement for accessing a half-duplex media, referred to as Universal Multiple Access (UMA), uses a mediated access technique where each station accesses the media in a round robin-type arrangement during an assigned time slot. A central network manager initializes each of the stations by identifying the number of stations (N) on the network and assigning the station a unique time slot (1 to N). For example, if the network has five (5) stations, the stations A, B, C, D, and E will be assigned time slots 1, 2, 3, 4, and 5, respectively.

After initialization, each UMA station can transmit only in its own assigned time slot. Each UMA station includes an internal current time slot counter that keeps track of the current time slot. If a UMA station does not have a data packet to send when the current time slot counter equals the corresponding assigned time slot, the station will remain idle for a predetermined interval before losing its turn to the next station in the time slot sequence. If the UMA station has a packet to send, the station will transmit when the current time slot counter corresponds to the assigned time slot. After transmission, the current time slot counter is updated for the next station, and the last transmitted station effectively goes to the end of the sequence. If the current time slot counter reaches the last station (e.g., station E), the counter wraps around to the first assigned time slot (e.g., station A).

The UMA arrangement has the advantage of providing a half-duplex network with bounded access latencies for applications such as audio, video, interactive multimedia, or real-time applications. However, efforts to combine UMA stations into existing Ethernet networks having stations using CSMA/CD, known as "mixed-mode" networks, have created the problem that the UMA stations will dominate over the CSMA/CD stations. UMA stations transmit without sensing a receive carrier, resulting in an increased probability of collisions on the media. Moreover, UMA stations do not use the TBEB algorithm in response to detecting a collision, but begin retransmission after waiting the minimum IPG. Hence, the UMA stations will invariably dominate over carrier-sense stations using CSMA/CD, and take over access to the media.

DISCLOSURE OF THE INVENTION

There is a need for an arrangement that controls access to a network media in network having stations using time slot multiple access protocol and stations using only a carrier-sense protocol.

There is also a need for an arrangement that enables a half-duplex network media to be shared equally between stations using Universal Multiple Access (UMA) and stations using Ethernet-compliant carrier-sense multiple-access with collision detection (CSMA/CD).

There is also a need for an arrangement that enables a network station to selectively change media access techniques on mixed-use networks to maintain effective network bandwidth without dominating the network media.

These and other needs are attained by the present invention, where at least a first group of unassigned time slots are reserved for use by carrier-sense stations to access the network media, and where stations using time slot multiple access protocol can switch to a carrier-sense protocol to contend for access during a second group of unassigned time slots.

According to one aspect of the present invention, a method of controlling access to a network media comprises the steps of determining a first number of first stations adapted to access the network media using a time slot multiple access protocol, where each first station accesses the network media only during a corresponding assigned time slot, determining a second number of at least one second station adapted to access the network media using only a carrier sense protocol, selecting a number of available time slots in accordance with the first and second number, and assigning to each of the first stations a corresponding one of the available time slots, the at least one second station having access to the network media during an unassigned time slot. Reserving the unassigned time slot ensures the more aggressive first stations defer to the second station, giving the second station an opportunity to access the media.

According to another aspect of the present invention, the method of accessing network media in a network station comprises the steps of storing a number of time slots identifying access intervals on the network media and a first assigned time slot specifying a first position in a sequence of the time slots, receiving a second mixed-use time slot specifying a second position in the sequence of time slots, counting an active time slot corresponding to the sequence of available time slots, transmitting data onto the media if the active time slot corresponds to the specified first position in the sequence, and sensing deassertion of the receive carrier if the active time slot corresponds to the specified second position in the sequence, and attempting transmission in response to the sensed deassertion and after a predetermined interpacket gap (IPG) interval.

Still another aspect of the present invention provides a network manager comprising a first detector detecting a first number of time-share stations operating according to a time slot multiple access protocol, a second detector determining a second number of the carrier-sense stations, an assignment portion determining a number of available time slots including assignable and unassignable time slots, the assignment portion outputting to each of the time-share stations a corresponding one of the assignable time slots, the carrier-sense stations having access to at least a first portion of the unassignable time slots.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

Reference is made to the attached drawings, wherein elements having the same reference numeral designations represent like elements throughout and wherein.

BEST MODE FOR CARRYING OUT THE INVENTION

Figure 1:
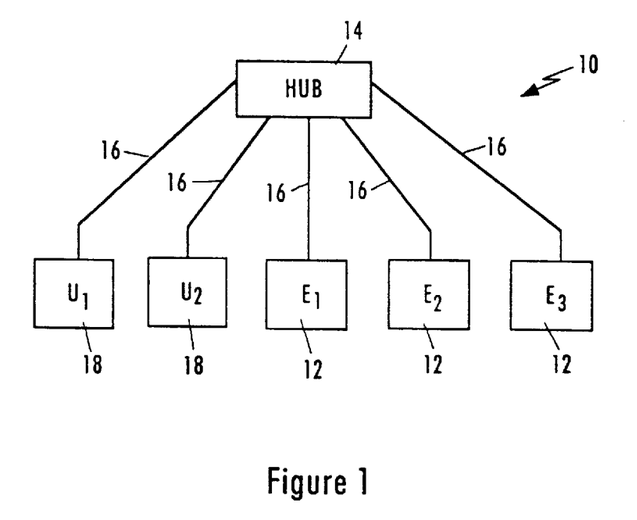
FIG. 1 is a diagram of a mixed-use network operating according to an embodiment of the present invention.

FIG. 1 is a block diagram of a mixed-use network operating according to the media access protocol of the present invention. The network 10 includes a plurality of carrier-sense stations 12 each having internal media access controllers (MAC) operating according to the Ethernet protocol (ANSI/IEEE 802.3). Hence, the MAC of each station 12 uses carrier-sense multiple-access with collision detection (CSMA/CD) to listen for traffic on the media 16. An exemplary network interface implementing the functions of the MAC for the carrier-sense stations 12 is the commercially available Am79C970 PCnet™-PCI Single-Chip Ethernet Controller for PCI Local Bus from Advanced Micro Devices, Inc., Sunnyvale, Calif., disclosed on pages 1-868 to 1-1033 of the AMD Ethernet/IEEE 802.3 Family 1994 World Network Data Book/Handbook, the disclosure of which is incorporated in its entirety by reference.

Each of the CSMA/CD stations 12, designated $E_1$, $E_2$, and $E_3$, are connected to a hub 14 by the media 16. The media 16 may be either coaxial, fiber optic, or twisted pair wire, and hence may couple the stations 12 to 10BASE-T, 10BASE-2, 100BASE-TX, 10BASE-T4, or 100BASE-FX networks. The network 10 may operate at 10 megabits per second (10 Mbit/s), 100 megabits per second (100 Mbit/s), or 1000 megabits per second (1000 Mbit/s).

The network 10 also includes time-share stations 18, each having internal MAC controllers operating according to the UMA time slot media access protocol. Each of the UMA stations 18, identified as $U_1$, and $U_2$, are connected to the hub 14 by the media 16.

According to the present invention, the hub 14 configures each of the CSMA/CD stations 12 and the UMA stations 18 during initialization to ensure that each station has substantially equal access to the media 16. As described below, the UMA stations 18 ($U_1$ and $U_2$) have time slots assigned by the hub 14 for accessing the media 16. The hub 14 also supplies to the UMA stations 18 the total number of available time slots (T), enabling each UMA station 18 to maintain its position in the sequence of available time slots.

Figure 4A:
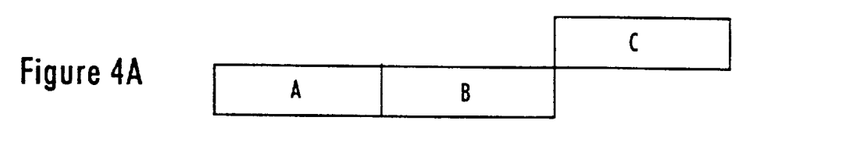
FIGS. 4A–4F are diagrams illustrating alternative time slot sequences according to the present invention.
Figure 4B:
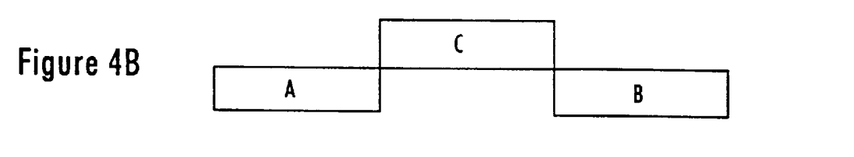

The network station 14 ensures that the CSMA/CD stations 12 have access to the media 16 by reserving additional time slots for use by the CSMA/CD stations 12. For example, FIGS. 4A and 4B are diagrams illustrating time slot sequences, where stations $U_1$ and $U_2$ are assigned slots A and B, respectively. Hence, each UMA station 18 will transfer data during its corresponding assigned time slot, and will defer during time slot C according to the UMA protocol. Since none of the UMA stations 18 transmit data during time slot C, the media 16 becomes idle, enabling one of the CSMA/CD stations 12 to access the media 16 during time slot C by waiting the minimum interpacket gap interval (IPG) after sensing deassertion of the receive carrier on media 16. As specified by Ethernet (ANSI/IEEE 802.3) protocol, the predetermined IPG is defined as 96 bit times for 10 Mbit/s, 100 Mbit/s, and 1000 Mbit/s networks. Each time slot of FIGS. 4A–4F, however, has a minimum duration greater than the predetermined IPG to enable the CSMA/CD stations 12 to access the media 16 during time slot C. For example, each time slot may have a duration equal to one slot time ($t_s$), defined under Ethernet (ANSI/IEEE 802.3) as 512 bit times for 10 Mbit/s and 100 Mbit/s networks, and preferably 4096 bit times for 1000 Mbit/s networks. Hence, each of the CSMA/CD stations 12 can access the media 16 within the time slot C after waiting the minimum IPG.

FIGS. 4A and 4B show the assigned time slots A, B and the unassigned time slot C arranged in a consecutive and interleaved sequence, respectively, where the CSMA/CD stations 12 share the unassigned time slot C. As traffic increases, however, it is desirable to add additional time slots to enable each Ethernet station $E_1$, $E_2$, and $E_3$ to access the media 16 with equality. Hence, the number of unassigned time slots can be selected to correspond to the number of CSMA/CD stations 12 on the network, as shown in FIGS. 4C and 4D.

Figure 4C:
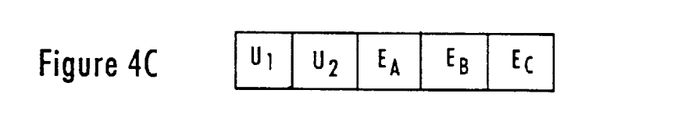
Figure 4D:
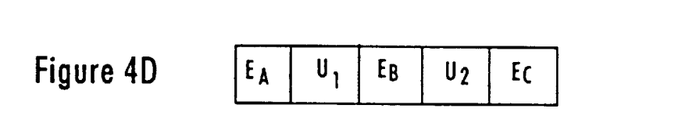

FIG. 4C shows the total number of available time slots selected in accordance with the total number of UMA stations 18 and CSMA/CD stations 12. The total number of available time slots (T) equals $T=N_U+N_E$, where $N_U$ equals the number of UMA nodes 18, and $N_E$ equals the number of CSMA/CD stations 12 using CSMA/CD protocol. Hence, the number of unassigned slots, $E_A$, $E_B$, $E_C$, corresponds to the number of Ethernet nodes $E_1$, $E_2$, $E_3$, granting each station on the network 10 an equal probability of accessing the media 16. FIG. 4D shows a time slot sequence having the same number of time slots, where the assigned and unassigned time slots are set in an interleaved sequence.

Figure 4E:
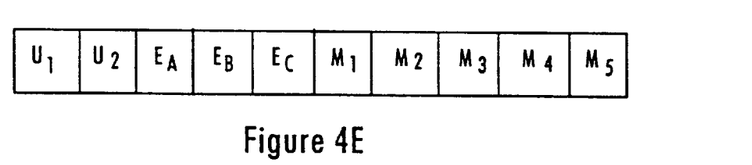
Figure 4F:
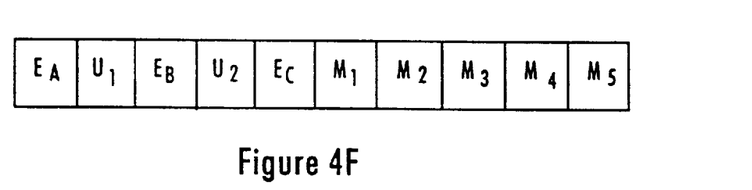

FIGS. 4E and 4F illustrate a number of time slots, where the total number of time slots (T) is assigned into three groups, namely UMA-only slots ($U_1$, $U_2$), CSMA-only time slots ($E_A$, $E_B$ and $E_C$), and mixed-use slots ($M_{1-5}$). The UMA-only time slots are assigned time slots, and the remaining time slots (E,M) are unassigned time slots. During assignment of the time slots to the UMA stations 18, a first portion of the unassigned time slots (E) are reserved for use only by the CSMA stations 12, whereas the second portion (M) of the unassigned time slots are reserved for use by any station using CSMA multiple-access techniques. As described below, the UMA stations 18 are modified to access the media according to the Ethernet CSMA/CD protocol when the current time slot is specified as one of the mixed-use time slots (M).

Figure 2:
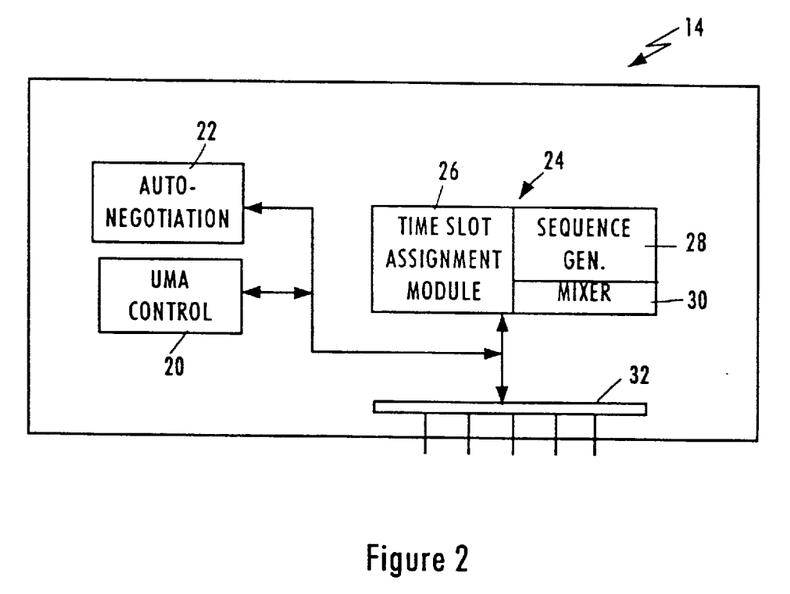
FIG. 2 is a diagram showing in detail the hub of FIG. 1.

FIG. 2 is as block diagram of the hub 14 of FIG. 1. The hub 14 includes a UMA controller 20 that detects the number of UMA stations 18 ($N_U$), an auto-negotiation portion 22 that determines the number of CSMA/CD stations 12 ($N_E$), and an assignment portion 24 that determines the number of available time slots (T). Assignment portion 24 determines the number of available time slots (T) based upon the number of UMA nodes ($N_U$) determined by the UMA controller 20 and the number of CSMA nodes 12 ($N_E$) determined by the auto-negotiation portion 22. The assignment module 24 includes a time slot assignment module 26 assigning each station 18 to a specific time slot. The assignment module 24 also includes a sequence generator 28 that determines the sequence of assignable and unassignable time slots, for example in a consecutive sequence as shown in FIGS. 4A and 4C, or as an interleaved sequence, shown in FIGS. 4B and 4D. The assignment module 24 also includes a mixer 30, also referred to as a mixed-use portion, that outputs to the time-share stations 18 via an interface 32 the position of the unassigned time slots when used as mixed-use time slots, described below.

Figure 3:
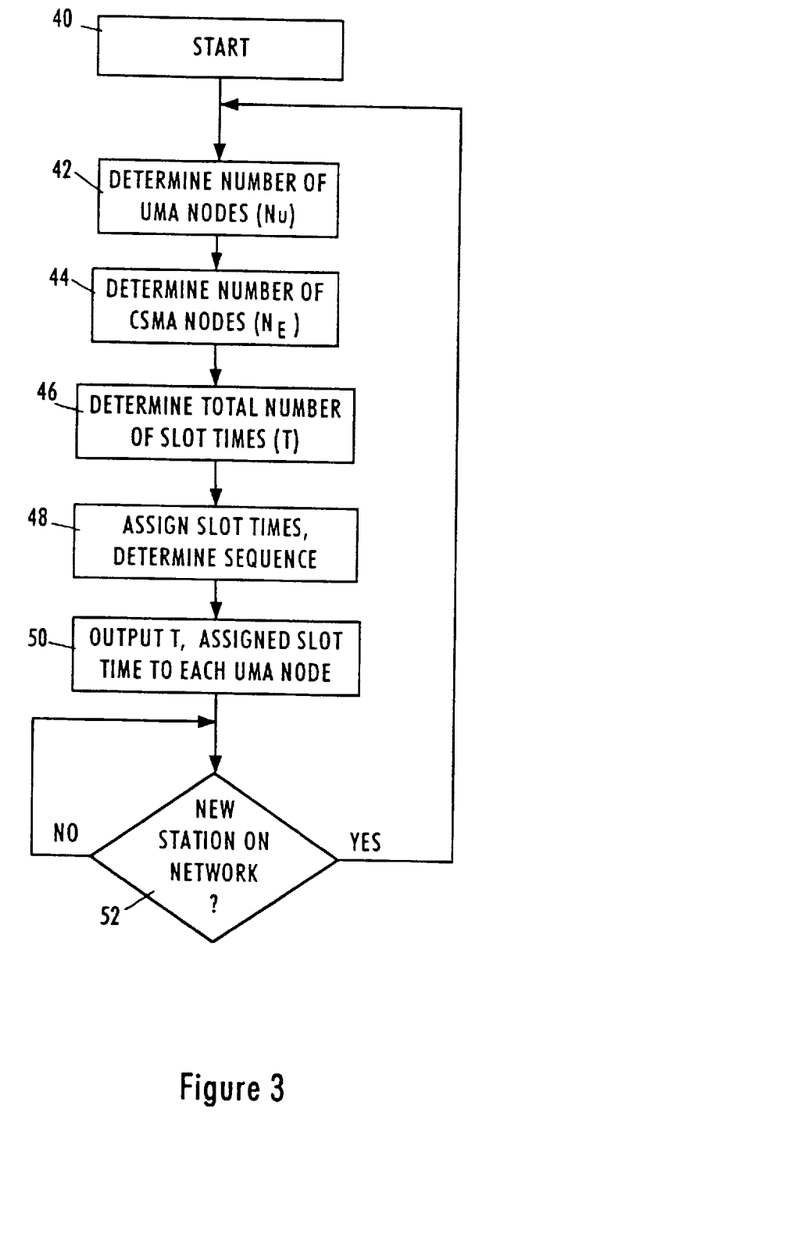
FIG. 3 is a flow diagram of the method for controlling access to the network media according to an embodiment of the present invention.

FIG. 3 is a flow diagram of the method of controlling access to the network media. As shown on FIG. 3, the network controller 14 begins in step 40 by performing configuration of the UMA nodes 18 and the CSMA/CD nodes 12 in step 40. The hub 14 determines the number of UMA nodes ($N_U$) in step 42 using the UMA control 20. The network controller 14 then uses the auto-negotiation portion 22 to perform auto-negotiation with the CSMA/CD stations 12, and determines the number of CSMA/CD stations ($N_E$) in step 44.

As recognized in the art, the auto-negotiation portion 22 executes a link startup procedure every time a link to a CSMA/CD station 12 is connected, powered on, or reset. The auto-negotiation unit 42 automatically configures the station 12 for operating according to the network configuration parameters, for example, network topology, signaling, distance to repeater, and number of stations on the network.

Upon completion of the auto-negotiation process in step 44, the CSMA/CD network station 12 will receive and store network configuration data, for example the number of stations 12 on the network using CSMA/CD protocol ($N_E$). If the UMA stations 18 have access to mixed-use time slots (M), described below, each CSMA/CD station 12 may also receive the total number of stations (N) including the CSMA stations 12 and the UMA stations 18, where $N=N_U+N_E$. Additional details regarding repeaters and auto-negotiation are disclosed in Breyer et al. "Switched and Fast Ethernet: How It Works and How to Use It", Ziff-Davis Press, Emeryville, Calif. (1995), pp. 60–70, and Johnson, "Fast Ethernet: Dawn of a New Network", Prentice-Hall, Inc. (1996), pp. 158–175, the disclosures of which are incorporated in their entirety by reference.

The network controller 14 then determines the total number of time slots in step 46, for example, according to the dedicated access sequences of FIGS. 4C and 4D, or the mixed-use access sequences of FIGS. 4E and 4F. If the UMA stations 18 operate according to the time slot multiple access protocol only, then the network controller 14 selects the number of available time slots by setting the number of available time slots to equal the sum of the UMA nodes and CSMA nodes, as shown in FIGS. 4C and 4D. However, if the UMA nodes 18 operate according to the modified mixed-use access, where the UMA nodes 18 are adapted to access the media using CSMA techniques, then the total number of time slots (T) is selected to equal at least twice the sum of the number of nodes, where T is greater than or equal to 2 ($N_U+N_E$), according to the sequences of FIGS. 4E and 4F.

After selecting the total number of time slots, the controller 14 assigns the time slots and determines the sequence of time slots in step 48. Hence, if the UMA nodes 18 use only the UMA access technique, then the sequence of FIG. 4C is established for a consecutive sequence, or FIG. 4D for an interleaved sequence. However, if the UMA nodes 18 are adapted to operate in CSMA mode, then the time slots are assigned as shown in FIG. 4E for a consecutive sequence, and FIG. 4F for an interleaved sequence. It will be recognized that the mixed-use time slots (M) may also be interleaved between the UMA-only time slots (U) and the CSMA-only time slots (E).

After determining the sequence of the assigned and unassigned time slots using the time slot assignment module 26 and the sequence generator 28, the network controller 14 outputs to the UMA stations 18 the total number of time slots (T) and the corresponding assigned time slots ($U_i$). The mixer 30 outputs the mixed-use time slots ($M_i$) if the UMA stations include CSMA mixed-use access capabilities. After the UMA stations 18 have received the above-described configuration data, the network begins mixed-use operation according to the time slot sequence formed by the sequence generator 28.

The network controller 14 also detects in step 52 if a new station is added to the network, for example a new station is powered on. In such a case, the controller 14 selects a new number of available time slots ($T_2$) by repeating steps 42, 44, 46 for the new station. After determining the identity of the new station, the time slots are reassigned and a new sequence is determined. The new sequence may be easily generated by adding an additional time slot at the end of the preexisting sequence in accordance with the identity of the detected new station as a UMA node 18 or a CSMA node 12. As a result, each of the UMA nodes 18 may be reassigned merely by supplying the recalculated total number of time slots (T), and maintaining the same time slot ($U_i$) in each of the existing nodes. Hence, the existing UMA nodes may be updated merely by updating the total number of time slots (T). At the same time, if the new station is a UMA station 18, the new station will receive the total number of time slots (T) and the corresponding new time slot ($U_i$). In addition, if an additional number of mixed-use time slots (M) are added, the UMA stations 18 are also updated with the new mixed-use time slots.

Figure 5:
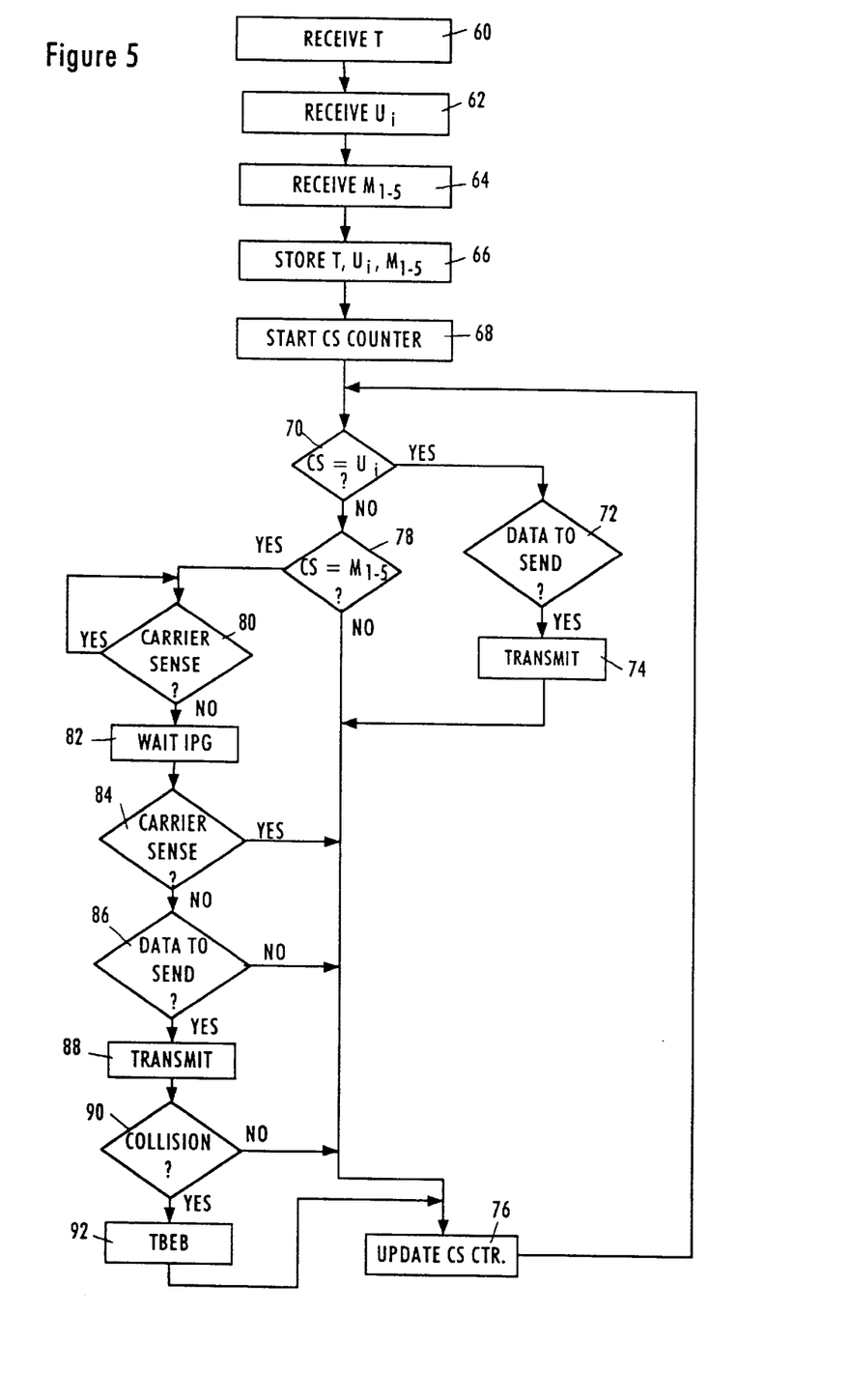
FIG. 5 is a flow diagram of the method of accessing network media in a network station according to an embodiment of the present invention.

FIG. 5 is a flow diagram illustrating operation of the MAC controller in one of the UMA stations 18 designed for selectively accessing the network media using either UMA protocol or CSMA/CD protocol according to an embodiment of the present invention. The MAC layer in the UMA station 18 begins by receiving in step 60 the total number of time slots (T). The UMA station 18 then receives in step 62 the assigned time slot in step 62 ($U_i$), specifying the position of the UMA station within the time slot sequence. For example, the UMA station $U_1$ would receive the assigned time slot ($U_1$=1) if the network controller 14 was implementing the sequence of FIG. 4E. Similarly, the UMA station $U_2$ would receive the assigned time slot ($U_2$=4) if the sequence of FIG. 4F was used.

The UMA station 18 then receives in step 64 at least one mixed-use time slot specifying at least a second position in the time slot sequence. Hence, if the sequence of FIG. 4E was used by the network controller 14, each UMA station would receive five (5) mixed-use time slots $M_1$, $M_2$, $M_3$, $M_4$, $M_5$, specifying time slots 6, 7, 8, 9, and 10 of the sequence in FIG. 4E, respectively. The UMA station 18 then stores the received information in step 66 in internal registers (not shown). Each UMA station 18 then begins counting the time slot sequence, for example as shown on FIG. 4E, by starting an internal current slot (CS) counter that identifies a currently-active time slot in step 68. The CS counter is a wrap-around counter that identifies the active time slot.

After starting the CS counter in step 68, each UMA station checks in step 70 whether the current value stored in the CS counter equals the corresponding assigned time slot in step 70. For example, if the CS counter had a value of CS=1, then the UMA station $U_1$ would identify a match according to the sequence of FIG. 4E. Hence, if in step 70 the UMA station determines that the active time slot (CS) corresponds to the station's assigned time slot ($U_1$), the UMA station having the corresponding assigned time slot checks in step 72 if it has data to send. If the station $U_1$ has data to send during the time slot CS=$U_1$, then the station $U_1$ transmits the data in step 74. If the UMA station does not have any data to send in step 72, the UMA station remains idle for a predetermined interval, and then updates its internal CS counter in step 76 by incrementing the wrap-around counter, thereby giving up its time slot to the next station in the sequence.

Assuming that station $U_1$ has updated its CS counter in step 76, the UMA station $U_1$, checks again in step 70 whether its internal CS counter matches the assigned time slot. According to the sequence of FIG. 4E, the UMA station $U_2$ has access to the media 16 during the next time slot (CS=2). Hence, station $U_1$ would proceed to step 78 to check if the current time slot corresponds to one of the identified mixed-use time slots (CS=$M_{1-5}$). Since the CS counter equals 2, the UMA station $U_1$ defers to another station and update its CS counter in step 76 according to the sequence of FIG. 4E. Thus, the station $U_1$ would defer during the time slots CS=2, 3, 4 or 5. As described above, since none of the UMA stations 18 are assigned to time slots 3–5, any of the CSMA/CD stations 12 have the opportunity to access the media during the time slots $E_A$=3, $E_B$=4, and $E_C$=5.

After the time slot $E_C$ of FIG. 4E, all of the stations of the network 10 have had an equal opportunity to access the media from a probability standpoint. After time slot $E_C$, the network begins counting mixed-use time slots (M), where each of the stations $U_1$, $U_2$, $E_1$, $E_2$, and $E_3$ equally contend for the media 16 using CSMA/CD protocol. Hence, each of the UMA stations include in their respective MAC layer control logic enabling each UMA station 18 to switch from UMA protocol to Ethernet-compliant CSMA/CD protocol when the current slot corresponds to an unassigned mixed-use time slot (CS=$M_i$).

Each of the UMA stations $U_1$ and $U_2$ switch from UMA protocol to CSMA/CD protocol by checking in step 78 if the current time slot counter (CS) identifying the active time slot corresponds to one of the mixed-use time slots ($M_{1-5}$). Hence, according to the sequence of FIG. 4E, the UMA stations 18 operate according to the UMA protocol when the CS counter equals 1, 2, 3, 4, and 5, and switch to the CSMA/CD media access protocol when the CS counter equals 6, 7, 8, 9, or 10 according to the sequence of FIG. 4E.

Referring to FIG. 5, the UMA station checks in step 78 whether the CS counter equals one of the mixed-use time slots ($M_{1-5}$). If the CS counter identifies one of the mixed-use time slots, the UMA station switches to Ethernet-compliant CSMA/CD protocol by detecting the presence of activity on the media 16 in step 80. Specifically, the physical layer of the MAC in the UMA station 18 detects the transition of the media 16 from an idle to non-idle state, as specified in the Ethernet (ANSI/IEEE 802.3) protocol. Upon detecting the non-idle state, the physical layer decodes the preamble of the transmitted data and asserts a control signal representing a valid receive data indication to the MAC. The valid receive data indication represents the detection of activity, i.e., valid data, on the media 16. Sensing deassertion of the receive carrier occurs when the physical layer of the MAC detects the transition of the media 16 from non-idle to idle state. In response to deassertion of the receive carrier, the MAC layer of the UMA station 18 starts an internal IPG timer in step 82. If in step 84 the UMA station 18 does not detect any activity on the media while waiting the IPG interval in step 84, the UMA station 18 checks in step 86 whether its internal transmit FIFO has a data packet to send. If the internal transmit FIFO has data to send, the UMA station begins to transmit the data packet in step 88 after waiting the IPG interval without detecting activity on the media. However, if the UMA station does not have any data to send, then the UMA station defers for the remaining term of the time slot and updates its internal CS counter accordingly in step 76.

After transmission has begun in step 88, the MAC of the UMA station checks in step 90 whether a collision has been detected. If a detection is detected in step 90, the MAC of the UMA station performs conventional collision mediation using the truncated binary exponential backoff (TBEB) algorithm in step 92, shown in FIG. 6.

If no collision is detected in step 90, then transmission is completed, and the UMA station updates its CS counter accordingly in step 76.

Figure 6:
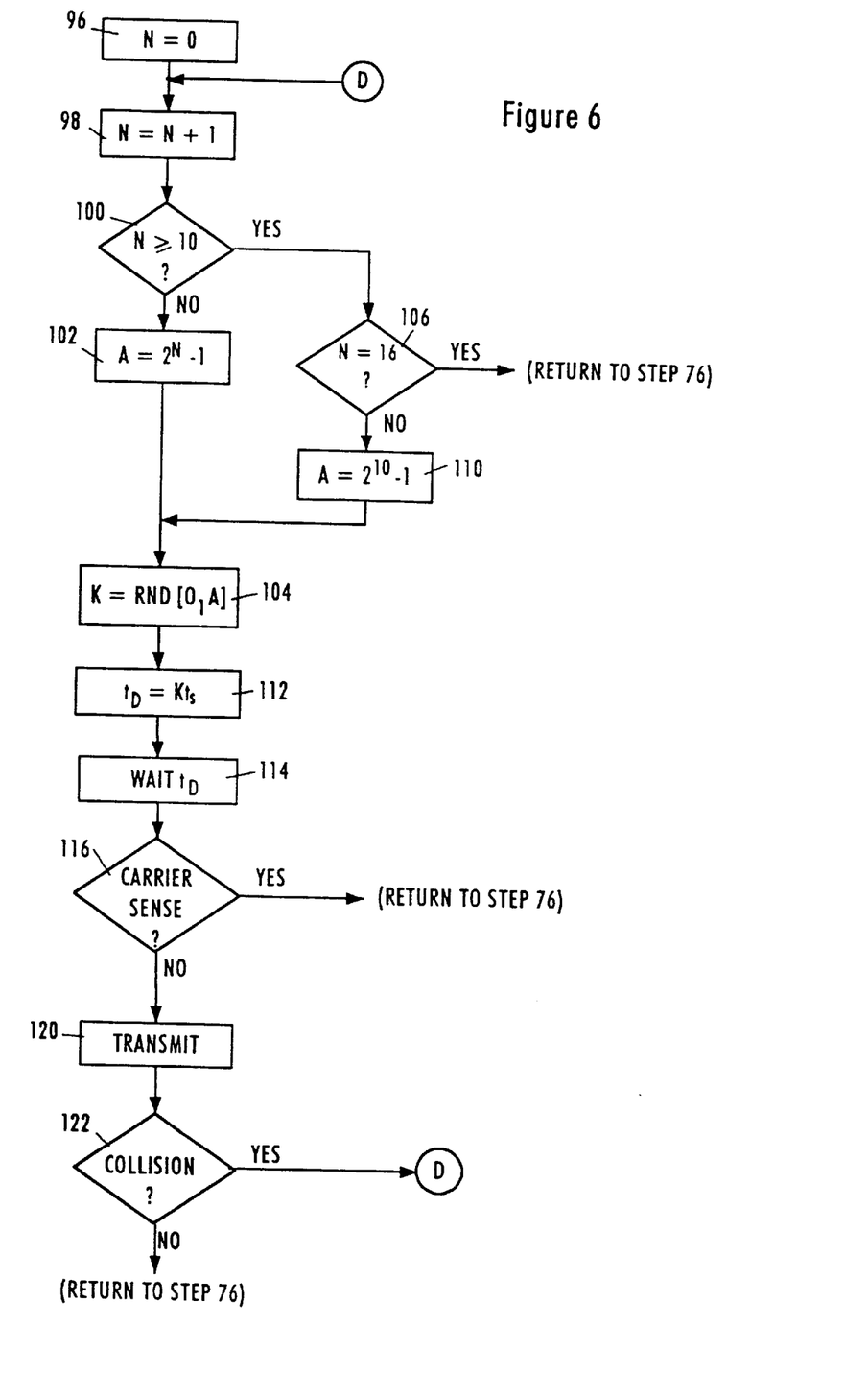
FIG. 6 is a flow diagram illustrating in detail the truncated binary exponential backoff algorithm of FIG. 5.

FIG. 6 is a flow diagram of collision mediation by the UMA station 18 according to the TBEB algorithm. An internal collision counter is first initialized in step 96 (N=0), and the collision counter is incremented in step 98. The MAC of the UMA station then checks in step 100 if the number of collisions (N) is greater than or equal to ten.

If the number of access attempts (N) is less than ten in step 100, then an exponential number of access attempts (A) is determined in step 102 according to the equation A=$2^N$-1. If in step 100 the number of collisions N is greater than or equal to ten, the MAC of the UMA station then checks in step 106 if the number of collisions is equal to sixteen. If the number of collisions is equal to sixteen, then the frame or data packet to be transmitted is discarded in step 98 in accordance with Ethernet (ANSI/IEEE 802.3) protocol. Alternately, the data packet may be saved for transmission during another time slot, for example during the UMA time slot ($U_i$). If N is less than 16, then the exponential number of access attempts is set in step 110 to $A=2^{10}-1$, or 1,023.

After calculating the exponential number of access attempts A, the MAC 22 randomly selects an integer value k in step 104 from the range between 0 and the exponential number of access attempts A having a maximum value of 1,023. The randomly-selected number k is then applied in step 112 to generate the delay time equal to a randomized integer multiple (k) of slot times ($t_s$).

After the delay time is calculated in step 112, the MAC of the UMA station 18 uses the internal collision delay counter to wait in step 114 for the calculated delay time $t_d$. During the delay time $t_d$, the UMA station checks in step 116 whether a carrier is sensed on the media. If a receive carrier is asserted on the media, the UMA station defers to the transmitting station and returns to step 76. Alternately, the UMA station may reset the delay timer and wait until deassertion of the receive carrier is sensed before attempting transmission again.

If the carrier is not sensed in step 116, then the UMA station 18 in step 120 attempts access of the media in response to the detected collision and after the collision delay interval $t_d$ in step 114. If a collision occurs in step 122, the process returns to step 98. If no collision is detected, then the process returns to step 76 after transmission is completed.

According to the present invention, UMA nodes and CSMA/CD nodes communicate on a shared media with equality and fairness without the UMA station dominating the media. According to one arrangement of the present invention, the number of available time slots is determined based upon the UMA nodes operating only in a UMA-type access protocol, where the total number of available time slots corresponds substantially to the total number of stations on the network. Hence, each network station has an equal probability of accessing the media. Once the media has been accessed by a station, the transmitting station may transmit any length packet (e.g., 1500 bytes) regardless of the duration of the time slot, typically 512 bit times. In such a case, the transmitting station will continue to transmit the data, and will give up the assigned slots upon completion of transmission. Hence, the term "time slot" refers to the ability to access the media in a defined sequence. Hence, the minimum duration of a time slot should be an IPG interval plus the maximum propagation delay between two stations.

In addition, the disclosed arrangement enables the access sequences to be ordered as desired, for example by interleaving UMA-only slots ($U_i$) and Ethernet-only slots ($E_i$) with mixed-use slots ($M_i$). In addition, bandwidth can be effectively allocated between the UMA stations and the CSMA/CD-only stations by changing the number of U, E, and M slots. For example, the bandwidth for a fixed packet size can be evenly divided between the five stations, resulting in 20% bandwidth per station. Additional bandwidth allocation may be provided for the CSMA/CD-only stations by increasing the number of unassigned access slots.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

We claim:

1. A method of controlling access to a network media, comprising:

determining a first number of first stations adapted to access the network media using a time slot multiple access protocol, where each first station accesses the network media only during a corresponding assigned time slot;

determining a second number of at least one second station adapted to access the network media using only a carrier sense protocol;

selecting a number of available time slots in accordance with the first and second numbers; and assigning to each of the first stations a corresponding one of the available time slots, the at least one second station having access to the network media during an unassigned time slot.

2. The method of claim 1, wherein the number of unassigned time slots from the group substantially corresponds to the second number.

3. The method of claim 2, wherein said selecting step comprises setting the number of available time slots to equal a sum of the first and second numbers.

4. The method of claim 2, wherein the assigning step comprises arranging the assigned and unassigned time slots in an interleaved sequence.

5. The method of claim 1, wherein the assigning step comprises:

reserving a first portion of the unassigned time slots for use only by the second stations; and reserving a second portion of the unassigned time slots for use by the first and second stations.

6. The method of claim 5, wherein the second portion reserving step comprises:

specifying in each of the first stations the second portion of the unassigned time slots as mixed use time slots;

converting in each of the first stations during the mixed use time slots from said time slot multiple access protocol to said carrier sense protocol.

7. The method of claim 5, wherein the assigning step further comprises arranging the assigned time slots and the first portion of the unassigned time slots in an interleaved sequence.

8. The method of claim 7, wherein the assigning step further comprises arranging the second portion of unassigned time slots consecutively after the interleaved sequence.

9. The method of claim 5, wherein the assigning step further comprises:

arranging the assigned time slots in a consecutive sequence; and arranging the first portion of the unassigned time slots consecutively after the assigned time slots.

10. The method of claim 5, wherein the selecting step comprises selecting said number to equal at least twice the sum of the first and second numbers.

11. The method of claim 10, wherein the assigning step further comprises:

setting the first portion of time slots to equal the second number; and setting the second portion of time slots to equal the sum of the first and second numbers.

12. The method of claim 1, further comprising:

detecting a new station on the network operating as one of the first stations and second stations;

reselecting a second number of available time slots in accordance with the detected new station; and reassigning to each of the first stations reassigned time slots.

13. The method of claim 12, wherein the reassigning step comprises:
outputting one of the available time slots to the new station; and
supplying the first stations with the second number of available time slots.

14. The method of claim 1, wherein said assigning step comprises sending to each of the first stations said number of available time slots.

15. A method of accessing network media in a network station, the method comprising:
storing a number of time slots identifying access intervals on the network media, and a first assigned time slot specifying a first position in a sequence of the time slots;
receiving a second mixed-use time slot specifying a second position in the sequence of time slots;
identifying an active time slot corresponding to the sequence of available time slots;
transmitting data onto the media if the active time slot corresponds to the specified first position in the sequence; and
sensing deassertion of the receive carrier if the active time slot corresponds to the specified second position in the sequence, and attempting transmission in response to the sensed deassertion and after a predetermined inter-packet gap (IPG) interval.

16. The method of claim 15, further comprising receiving the number of time slots, the first assigned time slot and the second mixed-use time slot from a network manager.

17. The method of claim 15, wherein the sensing step comprises using carrier sense multiple access with collision detection (CSMA/CD) to detect the deassertion of the receive carrier.

18. The method of claim 17, wherein the attempting access step comprises:
detecting a collision on the media;
calculating a collision delay interval as an integer multiple of time slots, the integer randomly selected from an exponential range of access attempts; and
attempting access of the media in response to the detected collision and after the calculated collision delay interval.

19. A network manager comprising:
a first detector for detecting a first number of time-share stations operating according to a time slot multiple access protocol;
a second detector for determining a second number of CSMA/CD stations on the network; and
an assignment module for determining a number of available time slots including assignable and unassignable time slots, the assignment module outputting to each of the time-share stations a corresponding one of the assignable time slots, the CSMA/CD stations having access to the unassignable time slots.

20. The network manager of claim 19, wherein the assignment module includes a mixed-use portion outputting to the time-share stations a first portion of the unassignable time slots, each of the time-share stations in response detecting presence of activity on the media before transmission during the first portion of the unassignable time slots.

21. The network manager of claim 20, wherein the assignment module sets said number of available time slots to at least twice the sum of the first and second numbers.

22. The network manager of claim 19, wherein the assignment module sets said number of time slots to a sum of the first and second numbers.

23. The network manager of claim 19, wherein the assignment module comprises a sequence generator determining a sequence of the assignable and unassignable time slots.

* * * * *

UNITED STATES PATENT AND TRADEMARK OFFICE
CERTIFICATE OF CORRRECTION

PATENT NO. : 5,774,658
DATED : June 30, 1998
INVENTOR(S) : Mohan Kalkunte, et al.

It is certified that error appears in the above-identified patent and that said Letters Patent is hereby corrected as shown below:

On the title page, item [56] insert the following:

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 5 | 3 | 1 | 9 | 6 | 4 | 1 | 06/07/94 | Fridrich et al. | | | |
| | | 5 | 4 | 5 | 3 | 9 | 8 | 7 | 09/26/95 | Tran | | | |
| | | | | | | | | | | | | | |

FOREIGN PATENT OR PUBLISHED FOREIGN PATENT APPLICATION

| | | DOCUMENT NUMBER | | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|
| | 0 | 3 | 3 | 1 | 1 | 6 | 2 | A | 09/89 | EP | | | | |
| | | | | | | | | | | | | | |

OTHER ART (Including Author, Title, Date, Pertinent Pages, Etc.)

Goeldner, E., "An Integrated Circuit/Packet Switching Local Area Network - Performance Analysis and Comparison of Strategies," International Teletraffic Conference, Vol. 5, 1985, NL, pp. 594-600.

Chen, W., et al., "CSMA/CD/TDMA: A Dynamic Combination for Voice and Data Integration," Multiple Facets of Integration, San Francisco, June 3-7, 1990, Vol. 3, Conf. 9, IEEE, pp. 842-849.

Signed and Sealed this

Twenty-sixth Day of October, 1999

*Attest:*

Q. TODD DICKINSON

*Attesting Officer*  Acting Commissioner of Patents and Trademarks